March 3, 1970  M. K. RICHMOND  3,498,434
LOAD LIMITING POWER TRANSMISSION SYSTEM
Filed Jan. 4, 1968  2 Sheets-Sheet 1
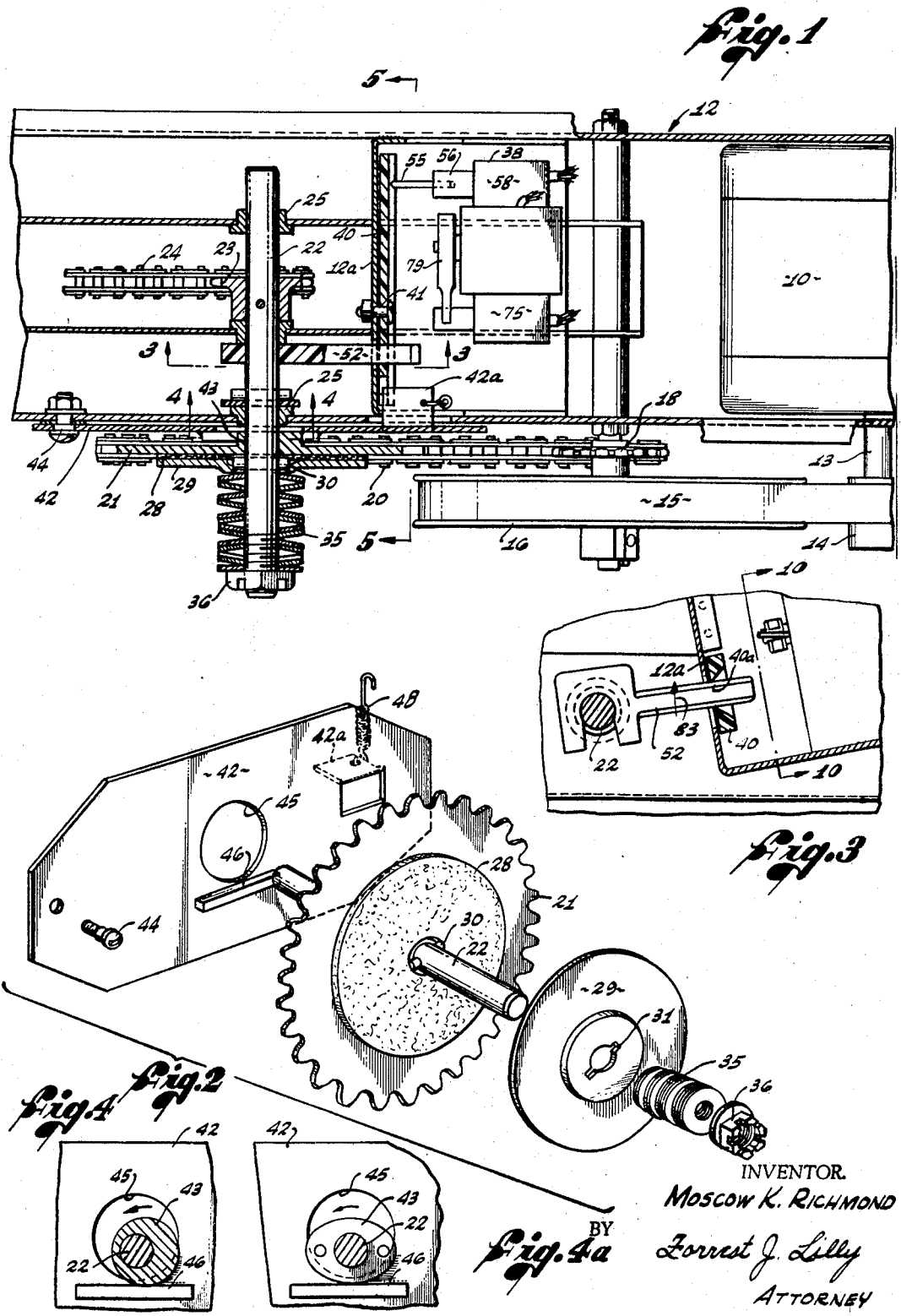
INVENTOR.
Moscow K. Richmond
BY
Forrest J. Lilly
ATTORNEY

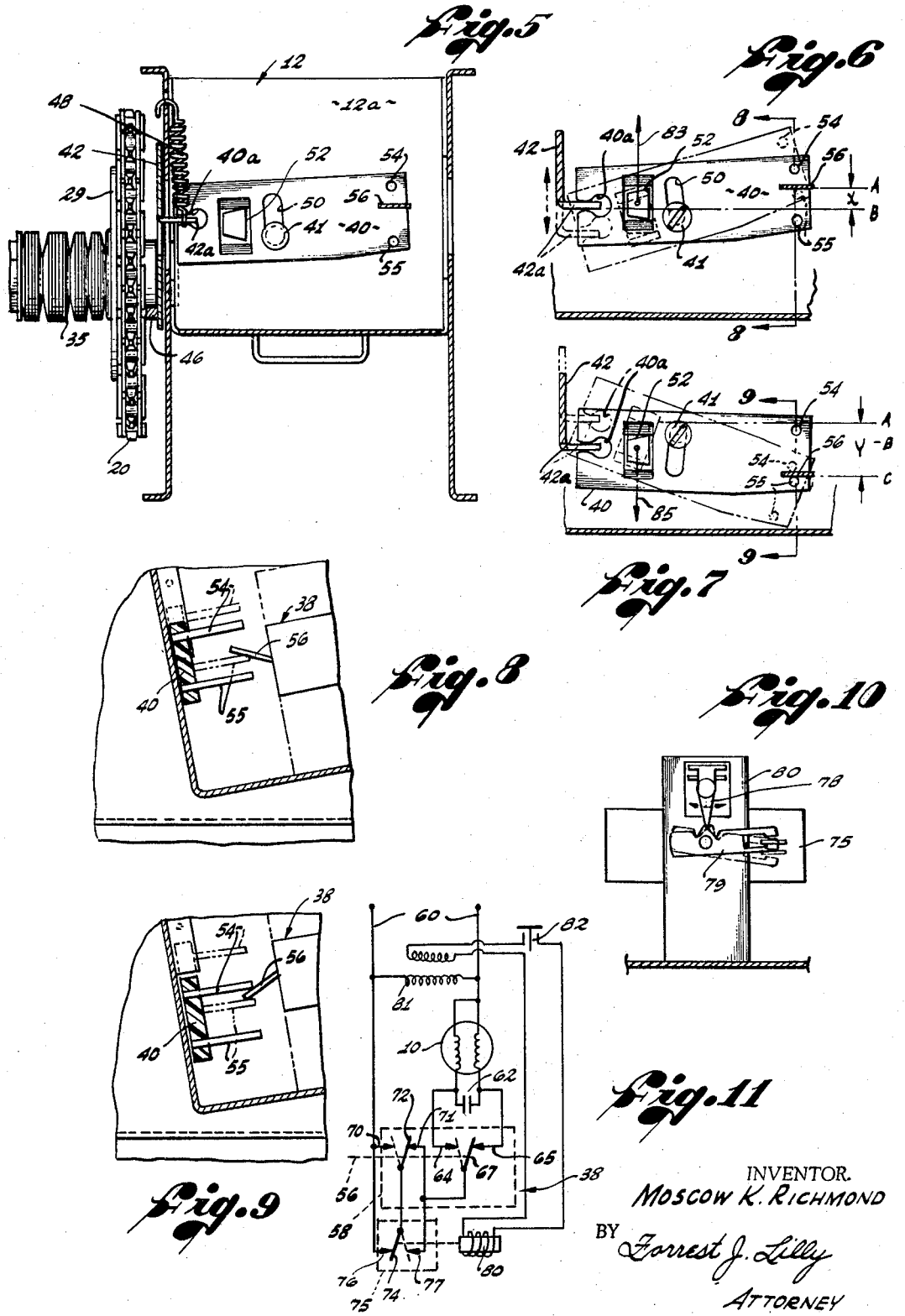

United States Patent Office 3,498,434
Patented Mar. 3, 1970

3,498,434
LOAD LIMITING POWER TRANSMISSION SYSTEM
Moscow K. Richmond, 2819 Butler Ave., Los Angeles, Calif. 90064
Filed Jan. 4, 1968, Ser. No. 695,618
Int. Cl. F16d 13/48
U.S. Cl. 192—150                    9 Claims

ABSTRACT OF THE DISCLOSURE

A mechanical load or speed-change sensing device is located in a power transmission system to interrupt the supply of power in the event of stoppage, overload, engagement with a limit stop, or other reduction in speed. The mechanism operates to shut off and/or reverse an electric motor supplying power so that it may operate as a safety device to guard against an overload or it may actuate a switch to reverse the electric motor at a given point in the travel of a driven member.

BACKGROUND OF THE INVENTION

The present invention in its broader as aspect relates to a mechanism for sensing a change in relative speed, or a stoppage, and more particularly to a mechanism for sensing a relative change in the speed of a rotary driven member caused by an overload, by stoppage of the work, or by engagement with a limit stop, such as to reduce the speed of the rotary member, or to completely stop it.

As an example of a specific application of the present invention, and for purposes of disclosure, but without any intention that the invention be limited thereto, the invention is described as applied to a door operator in which the speed change sensing mechanism automatically shuts off an electric motor which supplies the power for operating the door, when the speed reduces, or drops to zero, thus automatically shutting off the power at each end of travel of the door, or at any time the door strikes an obstruction, and also effects a change in position of a motor reversing switch so that the door moves in the opposite direction when the motor is again energized.

In general, the present invention may be utilized as a speed-change sensing mechanism to respond to either an overload or a stoppage in a mechanical power transmission system. A door operator is but one typical example of a member to be moved back and forth over a given path.

Power transmission systems to door operators, in common with typical power transmission systems, generally have a rotating member turning in synchonism with the load travel. It is apparent that a mechanical reaction to the change in speed, or to stoppage, of such a rotating member can be utilized to produce a quicker, more reliable means for controlling the motor and have the advantage of effecting control at any point in the path of the door as well as at the two ends of normal travel of the door. Such a means can be built strong enough for reliable, repeated operation and be in continuous, rather than occasional, use.

Thus, it is evident that a general object of the present invention is to provide a novel speed-change or stoppage sensing mechanism for sensing changes in the rotary speed of a member in the power train of a power transmission system.

Another object of the invention is to provide a mechanism of the character described which performs desired control functions in response to speed changes or stoppages sensed by the mechanism, thus controlling the operation of a prime mover, for example an electric motor.

Mechanisms of the class of the present invention are shown in my Patent No. 3,337,017, issued Aug. 22, 1967, for "Load Limiting Power Transmission System" and in my co-pending application, Ser. No. 374,768, filed June 12, 1964, and now Patent No. 3,411,612, for "Door Operator With Speed-Change Sensing Mechanism."

The present invention is in the nature of an improvement over the mechanism shown in this patent and application. The improvements are concerned with increasing the certainty of operation, accuracy, and quickness of response.

In the device of the issued patent, over-travel and return of a driven member are utilized in causing the mechanism to respond to the overload or stoppage. Since it is not always practical to permit or obtain this over-travel and return, it is a further object of the present invention to provide a sensing mechanism in which such over-travel is not involved and which thereby increases or broadens the range of application of the invention.

SUMMARY OF THE INVENTION

These objects of the present invention have been achieved by providing in a power transmission system a speed-change sensing mechanism which comprises a member driven through a friction clutch from a driving member, the clutch having means to limit the force or power transmitted by the clutch and therefore by the system. The mechanism includes an operating lever which is adapted to operate an electric switch that in turn controls the motor acting as a prime mover to drive the driving member mentioned above. This operating lever is pivoted to be oscillated through a normal range of movement in response to motion derived from the driving member, that is, from the driving side of the clutch. In this fashion, the lever continues to oscillate after the driven member stops or slows down from its normal speed relative to the driving member, as long as the prime mover is energized.

Within this normal range of oscillation, the lever does not actuate the motor switch. Means are provided for increasing the range of movement of the lever by changing its position in relation to the center of oscillation. It is held within the so-called normal range of travel by a biasing member which is activated by movement of the driven member of the power transmission system. When the driven member ceases to move or sufficiently reduces its relative speed, the biasing member becomes inactive; and means are provided for then shifting the unbiased lever in a manner to increase its range of oscillation sufficiently that the motor control switch is actuated by it.

BRIEF DESCRIPTION OF THE DRAWING

The present invention, as well as its objects and advantages, will be more readily understood by reference to the following description and to the annexed drawing, in which:

FIG. 1 is a combined plan and partial horizontal section of a power transmission system embodying the present invention;

FIG. 2 is an exploded perspective of the clutch elements and a lever constituting means for oscillating the switch operating lever;

FIG. 3 is a fragmentary vertical section and elevation on line 3—3 of FIG. 1;

FIG. 4 is a fragmentary vertical section and elevation on line 4—4 of FIG. 1;

FIG. 4a is a view similar to FIG. 4 illustrating a variational form of cam;

FIG. 5 is a vertical transverse section and elevation on line 5—5 of FIG. 1;

FIGS. 6 and 7 are fragmentary views which are portions of FIG. 5, illustrating variational positions of the switch operating lever;

FIGS. 8 and 9 are similar fragmentary sections on lines 8—8 and 9—9 of FIGS. 6 and 7, respectively;

FIG. 10 is a vertical section and elevation on line 10—10 of FIG. 3; and

FIG. 11 is a circuit diagram.

DESCRIPTION OF A PREFERRED EMBODIMENT

Referring now to the drawing, and especially to FIG. 1, the mechanism therein illustrated comprises a prime mover 10, typically and preferably a reversible electric motor which, together with the rest of the mechanism subsequently described, is mounted upon an open frame indicated generally at 12. The output shaft 13 of the motor is provided with a drive pulley 14 over which passes drive belt 15 trained around driven pulley 16. Pulley 16 is mounted rotatably on frame 12 in a suitable manner, while sprocket 18 is mounted upon the hub of pulley 16, or is otherwise attached to the pulley in order to be rotated therewith.

Roller chain 20 passes around sprocket 18 and a second larger sprocket 21 which may be viewed as the driving or input member of the speed-change sensing mechanism described below. Power is transmitted through this mechanism, as will be described, to driven shaft 22 on which is mounted output or driven sprocket 23 driving roller chain 24 connected with any suitable load, not shown in the drawing. In the event that the speed-change sensing mechanism is employed to open and close a door of the overhead type, chain 24 is connected to that load in a manner which is illustrated in my issued patent identified above. However, in the more general aspect of the invention, any suitable load may be connected to chain 24.

Driving sprocket 21 is mounted to turn freely upon output shaft 22 in response to power applied to the sprocket by the chain 20. Shaft 22 is also rotatably mounted in frame 12 in suitable journal bearings 25.

As may be seen particularly in FIG. 2, there is applied to one face of sprocket 21 clutch disc 28 which is the driving element of a pair of cooperating clutch elements. The disc may be of any type of material, for example, a non-metallic material or a metallic material such as sintered bronze. Various suitable materials are well known in the art for this purpose and are designed to generate an adequately high coefficient of friction in contact with a steel member, in this case the driven clutch plate 29. Clutch plate 29 is mounted on shaft 22 concentrically with clutch plate 28 and sprocket 21.

Means are provided for transmitting torque from driven plate 29 of the clutch assembly to shaft 22. This means comprises pin 30 extending through shaft 22 and received within diametrically opposed recesses 31 in clutch plate 29. Engagement between the pin and the plate transmits torque to the shaft.

The clutch assembly is completed by a plurality of Belleville washers 35 mounted on shaft 22 between the outer surface of clutch plate 29 and nut 36 on the end of the shaft. Washers 35 provide a resilient means for urging the driving and driven elements of the clutch into frictional driving engagement; and the axial thrust of the washers against clutch plate 29, and hence the maximum or limiting torque transmitted, can be adjusted to a desired value by turning nut 36 to compress the washers to the extent desired.

From the foregoing description, it will be seen that power is transmitted through the mechanism in sequence from motor 10 through drive belt 15, pulley 16, sprocket 18, and chain 20 to drive sprocket 21. It then flows through the clutch, comprising elements 28 and 29, to shaft 22 to sprocket 23 and thence to chain 24 connected to the moving load.

The switch controlling motor 10 is indicated generally at 38 and will be described in greater detail later. This switch is operated by switch operating lever 40 which is pivotally mounted at a fixed fulcrum provided by a pivot pin 41 mounted on transverse wall 12a of the frame structure. The switch operating lever is oscillated by secondary lever 42, shown particularly in FIG. 2. The secondary lever and a cam 43 together provide means for oscillating operating lever 40 in response to motion generated by the driving member.

Lever 42 is pivotally mounted at 44 on frame 12 to oscillate about the pivot in a plane normal to the axis of shaft 22. Shaft 22 passes through opening 45 in lever 42; and rotating cam 43, which may be an integral portion of the hub of sprocket 21, bears against a surface on lever 42 provided by bar 46, as shown particularly in FIG. 4. Lever 42 is normally urged upwardly to bring bar 46 against eccentric 43, by a biasing means here constituted by a spring 48 attached to the lever at a position removed from pivot 44. The spring is also attached to frame 12, as shown particularly in FIG. 5.

Rotation of drive sprocket 21 rotates cam 43 causing lever 42 to oscillate; and this oscillatory motion is transmitted to operating lever 40 by engagement between the two levers. This engagement may be effected in any suitable manner, but typically tab 42a is lanced from lever 42 and turned outwardly to project laterally therefrom into a notch 40a in one end of lever 40, as shown particularly in FIG. 5.

It will be noticed from FIG. 5 that fixed pivot pin 41 passes through an elongated opening 50 in lever 40, the opening permitting the lever to shift its position relative to the center of oscillation established by fixed pivot 41. For reasons which will become more fully apparent, means are provided for biasing the switch operating lever into a predetermined position with respect to pivot 41. This biasing means comprises an arm 52 which is shown especially in FIG. 3. At one end, arm 52 is provided with a yoke which slips over and frictionally engages shaft 22. The frictional engagement is such as to cause arm 52 to turn with shaft 22, if unrestrained. However, arm 52 projects through an opening 40a in frame wall 12a and an aligned opening in lever 40. The arm 52 preferably has a relatively close fit in opening 40a, and the latter is preferably defined at top and bottom by knife-edge formations, as shown best in FIG. 3, all in such manner that the engagement of the knife edges with arm 52 forms a secondary fulcrum for the lever 40. Lever 40, as will become apparent, restrains rotational movement of arm 52 so that in normal operation, the arm in actuality moves only through a limited arc as the result of torque applied to it by shaft 22.

The oscillatory movement of lever 40 operates a switch in switch assembly 38. As shown in FIGS. 5 and 8, lever 40 is provided with a pair of spaced pins 54 and 55 so spaced that within the normal range of angular movement of the lever, these pins do not engage switch operating arm 56 which is located between the two pins. Operating arm 56 of the switch assembly actuates a switch which controls the operation of electric motor 10, typically by stopping the motor.

As used herein, the term "switch" refers generally to any type of control mechanism and includes not only an electric switch as illustrated, but also a mechanical switch, such as a valve. In the broad aspect of the invention, the switch assembly 38 may comprise one or more switches and may be of any suitable type. A preferred switch assembly 38 is illustrated diagrammatically in FIG. 11 which is a wiring diagram showing the connection of the switch to motor 10.

In the preferred embodiment illustrated, the prime mover 10 is a reversible motor suitable for moving a door, not shown, between open and closed positions. The circuit illustrated is connected to a suitable source of electric power, not shown, by a pair of conductors 60. Motor 10 has two stator coils which are connected in parallel to one of the conductors 70 with capacitor 72 connected across the coils. These coils of the motor are respectively connected to fixed contacts 64 and 65 of switch 58. These two fixed contacts cooperate with movable contact 67 to form a single pole, double throw switch. Switch 58 also includes another single pole, double throw switch, which comprises fixed contacts 70 and 71 which cooperate with movable contact 72. Movable contacts 67 and 72 of switch 58 are ganged together and are shifted simultaneously by switch operating arm 56 when the latter is moved between the two positions shown in FIGS. 8 and 9. Movable contact 67 of the first switch mentioned is connected electrically to fixed contact 71 of the second switch. Fixed contact 70 of the second switch is connected to one supply conductor 60 while the movable contact 72 of the second switch is connected to movable contact 74 of switch 75.

Switch 75 is a single pole, double throw switch comprising a pair of fixed contacts 76 and 77 cooperating with movable contact 74 which is shifted between the fixed contacts by solenoid 80. Fixed contact 77 is connected to both fixed contact 71 and movable contact 67 of switch 58, while the opposite fixed contact 76 of switch 75 is connected to a power supply conductor 60. The movable contact 74 is shifted from one position to another by successive energizations of solenoid 80 by power derived from low voltage transformer 81. In series with the secondary of transformer 81 is a manual push button 82.

All the double throw switches indicated in the wiring diagram are of the snap action or over-center type in which the movable contacts are spring-biased into engagement with either one of the two fixed contacts with which they cooperate. Accordingly, successive energizations of relay coil 80 shift movable contact 74 between the full line and dotted line positions, but the switch is normally closed in one position or the other. Likewise, the two sections of switch 58 are normally closed in one of the two positions shown.

Two switches or sections ganged together are designated as switch 58 and are operated together mechanically by arm 58. The third switch or section 75 is operated electromagnetically by coil 80. This third switch has its movable contact 74 connected to the movable contact 72 of one other section.

Assume that the movable contacts all occupy the solid line positions shown in the wiring diagram. The circuit is now completed from a first supply conductor 60 through the motor coil driving the motor in a forward direction and then in succession through contacts 65, 67, 71, 72, 74, and 76, to the second supply conductor. At the end of the load travel in the forward direction, switch lever 58 is moved, as will be explained, to the position of FIG. 9, thereby shifting the contacts 67 and 72 to the dotted line positions and opening the circuit at 71, 72 through motor 10. The motor is now de-energized and stops. The motor remains in this state until, by pressing push button 82, relay coil 80 is energized. This coil, when energized, shifts the movable contact 74 from the solid line position to the dotted line position into engagement with contact 77. Now the circuit is completed through the motor stator coil driving the motor in the reverse direction, fixed contact 64 and movable contact 67 of switch 58 contacts 77 and 74 of relay 75 and contacts 72 and 80 of switch 58 to the supply conductor. At the end of the reverse travel of the load, the movement of switch arm 56 back to the position of FIG. 8 again opens the circuit through the motor and de-energizes the motor, bringing it to a stop, by shifting movable contacts 67 and 72 back to the alternate solid line position shown in FIG. 11. Solenoid 80 and switch 75 are shown in FIG. 10 wherein it will be seen that the arm 78, which is moved downwardly at each energization of the coil, causes pivoted arm 79 to change positions, thus effecting the shift of the movable contact 74 between engagement with contacts 76 and 77 as described.

Having described the construction of the present invention, its operation will now be set forth. Assume that motor 10 is being driven in the forward direction so that drive sprocket 21, shaft 22, and driven sprocket 23 thereon are all rotating in a counterclockwise direction as viewed in FIG. 4 (see the arrow in FIG. 1). Torque is being transmitted from driving member 21 through the clutch elements 28 and 29 to shaft 22, the maximum amount of this torque being limited by the frictional force developed between clutch elements 28 and 29. As driving element 21 rotates, cam 43, by engagement with follower 46 on lever 42, causes this secondary lever to oscillate about fixed pivot 44. This oscillatory motion of the lever carries projection 42a between the upper (full line) and lower (dotted line) positions in FIG. 6. By engagement with primary lever 40, the oscillatory motion of lever 42 is transferred to the primary lever and lever 40 is rocked about pivot 41 between the solid line and dotted line positions of FIG. 6.

The counterclockwise rotation of shaft 22 applies torque in the same direction to arm 52 passing through lever 40. The counterclockwise torque applied to arm 52 tends to continuously move the outer end of the arm upwardly, as indicated by arrows 83 in FIGS. 3 and 6, as long as shaft 22 rotates. The continuous upward force applied by arm 52 to lever 40 biases lever 40 to a position in which the lever is held upwardly relative to the fixed pivot pin 41. In other words, the bias on the lever 40 applied by arm 52 between lever 42 and pivot 41 maintains pivot 41 seated at the lower end of the elongated opening 50 through which pivot pin 41 passes.

As the secondary lever 42 moves downwardly from the solid line position to the dotted line position, the upwardly applied biasing force is constant on the lever; but arm 52 is actually rotated clockwise with respect to shaft 22, because pivot 41 is stationary as lever 40 shifts from the solid line to the dotted line position of FIG. 6. Then, as lever 42 moves upwardly again, arm 52 rises and follows the movement of the lever 40 as it returns to the solid line position, continuously holding lever 40 in the position in which it oscillates about pin 41 at the lower end of elongated opening 50. Under these conditions of forward drive, it will be noticed that the oscillation of switch operating lever 40 is maintained within a normal angular range in which pins 54 and 55 move without coming into engagement with switch arm 56. This assumes that switch arm 56 is maintained at the height level indicated at A in FIG. 6, this being the position of the switch to initiate forward movement of motor 10.

If now an overload condition arises, as when the load reaches the end of its travel and ceases to move, or meets an obstruction, a condition exists in which the torque required to move the load is in excess of that which can be transmitted by clutch elements 28 and 29. As a consequence, the clutch slips allowing driving element 21 to continue to rotate while driven shaft 22 ceases to turn. Secondary lever 42 continues to oscillate; but the exact sequence of events depends on the point in the cycle of movement of lever 42 at which shaft 22 stops. Assume that the left-hand end (FIG. 6) of lever 42 is at the top of its travel (solid line position) and will move downwardly (clockwise) from the solid line position of FIG. 6 to the dotted line position, which is the same as the solid line position of FIG. 7. As explained before, the downward movement of the switch operating lever 42 at the location of arm 52 moves arm 52 downwardly since the arm 52 can slip on shaft 22.

Because shaft 22 is now stationary, there is no torque producing an upwardly directed force on the arm 52 and said arm becomes inactive as a biasing agent. Arm 52 with its frictional grip on the now stationary shaft 22, thus remains stationary after it reaches the lower end of its vertical motion, and on the next upwardly movement (counterclockwise) of lever 42, arm 52 then acts as a fulcrum, and lever 40 then pivots thereon, being thereby shifted in position with respect to pivot 41 so that the lever now moves to the dotted line position of FIG. 7 as lever 42 moves upwardly. This is possible because the switch operating lever 42 pivots around the stationary biasing arm 52 and the portion of the lever 42 beyond the biasing arm moves downwardly as the secondary lever moves up, the slot 50 allowing the lever to swing down relative to pivot pin 41. The result thus is to shift lever 40 on arm 52, now acting as a fixed fulcrum, with respect to pivot or fulcrum 41, placing the pivot pin 41 at the upper end of elongated opening 50. In moving down to the position of FIG. 7, it will be seen that pin 54 is carried out of its normal range of oscillation and engages and carries downwardly with it switch arm 56, the switch arm now being depressed and moved to the position at a new level C as shown in FIG. 7. The result is to shift contacts 72 and 67 of switch 58 and to stop motor 10.

If shaft 22 stops when arm 52 is at the bottom of its travel, lever 40 shifts in position at once, in the same manner described. If shaft 22 stops when arm 52 is moving down, it is obviously carried down fully and then the switch operating lever shifts, as described.

Because of the construction of the switch assembly when motor 10 is again energized, it turns in a reverse direction, that is, drive sprocket 21, clutch elements 28 and 29, and driven shaft 22 now revolve in a clockwise direction as viewed in FIGS. 2 and 3. The clockwise rotation of the shaft 22 now applies a clockwise torque to biasing arm 52 with the result that the arm 52 applies a downwardly directed biasing force to switch operating lever 40, as indicated by arrow 85 in FIG. 7. This clockwise torque tends to keep arm 52 at the lowermost position which it can assume. As secondary lever 42 moves up, lever 40 pivots about pin 41, now at the upper end of elongated opening 50 and arm 52 can be moved counterclockwise against the biasing torque to raise arm 52 sufficiently to permit switch lever 40 to assume the broken line position of FIG. 7. As soon as auxiliary lever 42 again moves downwardly, the biasing arm follows the lever movement and as a consequence the lever now rocks about the axis established by pin 41 at the upper end of opening 50. Again, the lever oscillates within a normal limited range of movement during the reverse rotation of motor 10 and the parts driven therefrom and, as before, pins 54 and 55 do not engage switch arm 56 as long as lever 40 moves in its normal limited range.

This condition continues to exist as long as the load moves normally in a reverse direction. When the load reaches the end of its travel, and an overload condition is again created, or meets an obstruction, clutch elements 28 and 29 again slip relative to one another allowing the driven shaft 22 to come to rest while the driving member 21 continues to turn and lever 42 continues to oscillate. While the exact sequence of events again depends on the exact point in the cycle at which shaft 22 stops, typically upward movement of lever 42 from the solid line position to the dotted line position of FIG. 7 raises arm 52 in the manner previously described. However, now that the downwardly directed biasing force has been removed, arm 52 is inactive as a biasing agent. Being stationary at the top end of its range, arm 52 becomes a fulcrum, with the result that as lever 42 subsequently moves downwardly from the dotted line position to the solid line position, the lever 40 rocks about stationary arm 52 and the portion of the lever beyond the biasing arm, that is, to the right of arm 52 when viewed in FIG. 7, is lifted back to the solid line position of FIG. 6.

This motion of lever 40 brings lower pin 55 out of the normal limited range of oscillation and into engagement with switch operating arm 56 as the pin moves from the dotted line position of FIG. 7 to the solid line position of FIG. 6. This engagement with the switch operating arm 56 returns the switch arm from its normal reverse operating position at level C to its forward movement at level A. The contacts 72 and 67 are now returned to the position for forward drive, and it will be apparent without further exposition that the previously described cycle can be repeated.

Assume now that the door in its travel collides with a yielding obstruction in such a way that it is slowed down relative to the driving member, say, to half its normal speed. The speed of rotation of driven shaft 22 then is reduced by half, as is the speed of oscillation of the bias arm 52; but slippage in the clutch slows driving member 21 to continue at or near its initial speed. It should now be evident that when, in the case of counterclockwise rotation of shaft 22, the arm 52 reaches the limit of its down stroke, along with the part of lever 40 with which it is engaged, the lefthand end portion of lever 40 may then swing upwards fast enough relative to the slowed down oscillation of arm 52 so that the lever 40 can fulcrum on slowly rising arm 52, and thereby shift the lever 40 to the switch throwing position of FIG. 7. This type of operation is made increasingly sensitive to relative speed reduction of the driven member or a change in speed ratio between input and output members by increase in the amplitude of oscillation of lever 42, and hence of lever 40.

FIG. 4a illustrates a double-lobe cam 43a that may replace cam 43. The advantage is that lever 42 then oscillates at double the rate with a single rise on the cam. Likewise the oscillation rate of switch operating lever 40 is doubled with the result that switch arm 56 is then actuated and motor 10 stopped in no more than a half revolution of shaft 22 as compared with a maximum of a full revolution when using a single-rise cam.

A feature of the invention is that the clutch slips during each stoppage or relative speed change. The clutch faces are thus kept clean and in good working order, as contrasted with devices of the prior art in which the clutch slips only in the event of emergency stoppages, which may not often occur. These seldom operated safety clutches commonly stick when finally called upon to function as intended.

The presently preferred embodiment of the invention described is typical of the invention, and it will be understood that the details described are for purposes of disclosure only. Accordingly, various changes in design, structure, and arrangement of the elements of the speed-change sensing mechanism, and particularly of the loads operated and the switch mechanism controlled, may be made without departing from the spirit and scope of the present invention.

I claim:

1. Mechanism for sensing a change in speed of a driven member relative to a driving member, comprising in combination:
   a driving member;
   a driven member;
   clutch means transmitting power from the driving member to the driven member, including means limiting the force transmitted by the clutch;
   a first lever pivoted at a fulcrum;
   means oscillating the first lever about said fulcrum in response to motion generated by the driving member;
   biasing means active in response to motion generated by the driven member biasing the first lever to maintain the fulcrum at a first position relative to the lever at which movement of the first lever is within a normal range, said biasing means first becoming inactive upon a change in relative speed of the driving and driven members;
   a cam rotated by the driving member;
   a second lever pivoted at a fixed fulcrum and oscillated about the fixed fulcrum by the cam, the second lever in turn oscillating the first lever about the associated fulcrum; and
   a switch engageable by the first lever at a position beyond said normal range of movement, said oscillating means acting to shift the first lever relative to the fulcrum to a second position when the biasing means is inactive to increase the range of lever movement beyond said normal range to actuate the switch.

2. Mechanism according to claim 1 in which the driving and driven members are coaxially mounted for rotation.

3. Mechanism according to claim 1 in which the biasing means is an arm frictionally engaging the driven member to turn therewith and restrained by the first lever to limited turning movement.

4. Mechanism for sensing a change in speed of a driven member relative to a driving member, comprising in combination:
   a rotatably mounted driving member;
   a rotatably mounted driven member;
   friction clutch means transmitting torque from the driving to the driven member including means limiting the transmitted torque to a predetermined value;
   a cam rotated by the driving member;
   a first lever pivoted at a first fulcrum and oscillated about said fulcrum by the cam;
   a second lever pivoted at a second fulcrum and oscillated about said second fulcrum by the first lever;
   biasing means active in response to rotation of the driven member biasing the second lever to a position relative to the second fulcrum in which oscillation of the second lever is limited to a normal range, said biasing means becoming inactive upon a change in relative speed of the driving and driven members;
   switch means actuated by the second lever at a position outside said normal range of movement;
   and means shifting the second lever relative to the second fulcrum to increase the range of travel thereof to engage the switch when the biasing means is inactivated.

5. A mechanism according to claim 4 in which the biasing means is an arm frictionally engaging the driven member to turn therewith and restrained by the second lever to limited turning movement.

6. A mechanism according to claim 4 that also includes:
   an electric motor drivingly connected to the driving member, said switch means controlling operation of the motor.

7. A mechanism according to claim 4 that also includes:
   a reversible electric motor drivingly connected to the driving member to turn the driving and driven members in either direction;
   and the switch means includes a reversing switch controlling the direction of drive of the motor, the biasing means responding to either direction of rotation of the driven member to reverse direction of bias force applied to the second lever.

8. A mechanism according to claim 4 in which the second lever engages the first lever and the switch near opposite ends of the second lever and the fulcrum is between the ends of the second lever.

9. A mechanism according to claim 8 in which the biasing means is an arm frictionally engaging the driven shaft to be turned thereby and engaging the second lever between the second fulcrum and the first lever.

References Cited

UNITED STATES PATENTS

| | | | | |
|---|---|---|---|---|
| 3,233,162 | 2/1966 | Richmond | 192—150 | XR |
| 3,411,612 | 11/1968 | Richmond | 192—150 | XR |

MARK M. NEWMAN, Primary Examiner

ALLAN D. HERRMANN, Assistant Examiner

U.S. Cl. X.R.

192—142; 318—264, 468